United States Patent [19]
Hanson et al.

[11] 3,964,301
[45] June 22, 1976

[54] ENGINE BRAKE HORSEPOWER TEST WITHOUT EXTERNAL LOAD

[75] Inventors: Richard Eric Hanson, Woburn; Thomas Edward Nolan, Jr., Medfield, both of Mass.

[73] Assignee: RCA Corporation, New York, N.Y.

[22] Filed: Oct. 21, 1974

[21] Appl. No.: 516,503

[52] U.S. Cl. .................................................. 73/116
[51] Int. Cl.² .................................. G01M 15/00
[58] Field of Search ................. 73/116, 117.2, 117.3

[56] References Cited
UNITED STATES PATENTS

| | | | |
|---|---|---|---|
| 3,657,922 | 4/1972 | Sibeud | 73/117.3 |
| 3,757,570 | 9/1973 | Cowley et al. | 73/116 |
| 3,757,571 | 9/1973 | Chamberas | 73/116 |
| 3,817,092 | 6/1974 | Ludloff | 73/116 X |
| 3,839,907 | 10/1974 | Hanson et al. | 73/116 |

Primary Examiner—Charles A. Ruehl
Attorney, Agent, or Firm—Carl V. Olson; Edward J. Norton

[57] ABSTRACT

Apparatus for and method of determining the brake torque and horsepower of an internal combustion engine without connecting an external load. Means are provided to operate the engine at full throttle and with all but one out of $n$ of successive ignitions inhibited, the value $n$ being selected so that the engine operates with just enough power to equal the frictional load of the engine and maintain an equilibrium speed at the upper end of the engine speed range. The engine is then operated momentarily with full ignition, and then with no ignition, during which a determination is made of the rate at which the engine decelerates through the equilibrium speed. The deceleration rate is multiplied by the known inertia of the engine to determine the friction torque of the engine at the equilibrium speed. The friction torque is multiplied by $n - 1$ to predict the brake torque of the engine at the equilibrium speed when operated normally with external load. Horsepower is determined by multiplying torque and speed.

10 Claims, 8 Drawing Figures

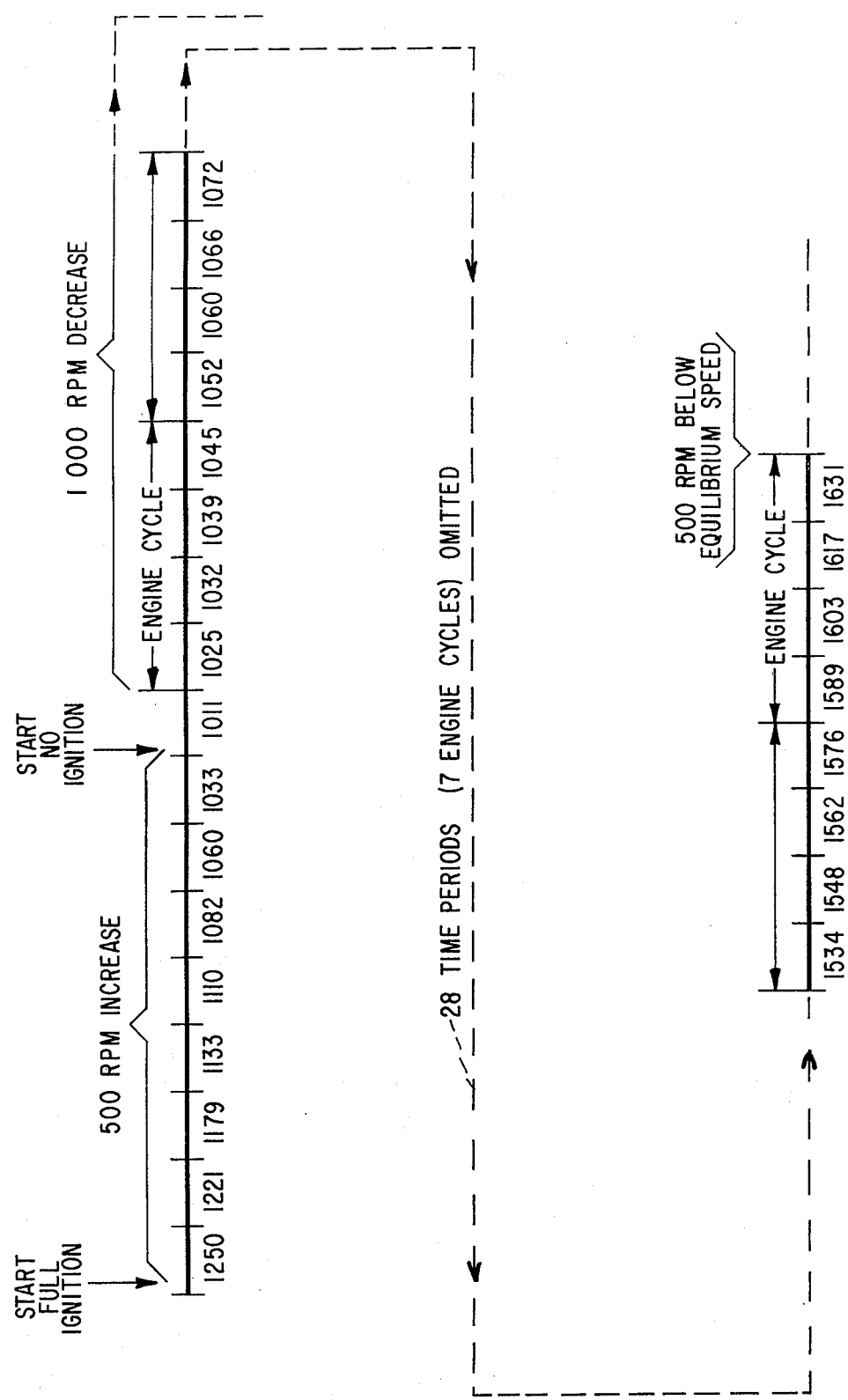

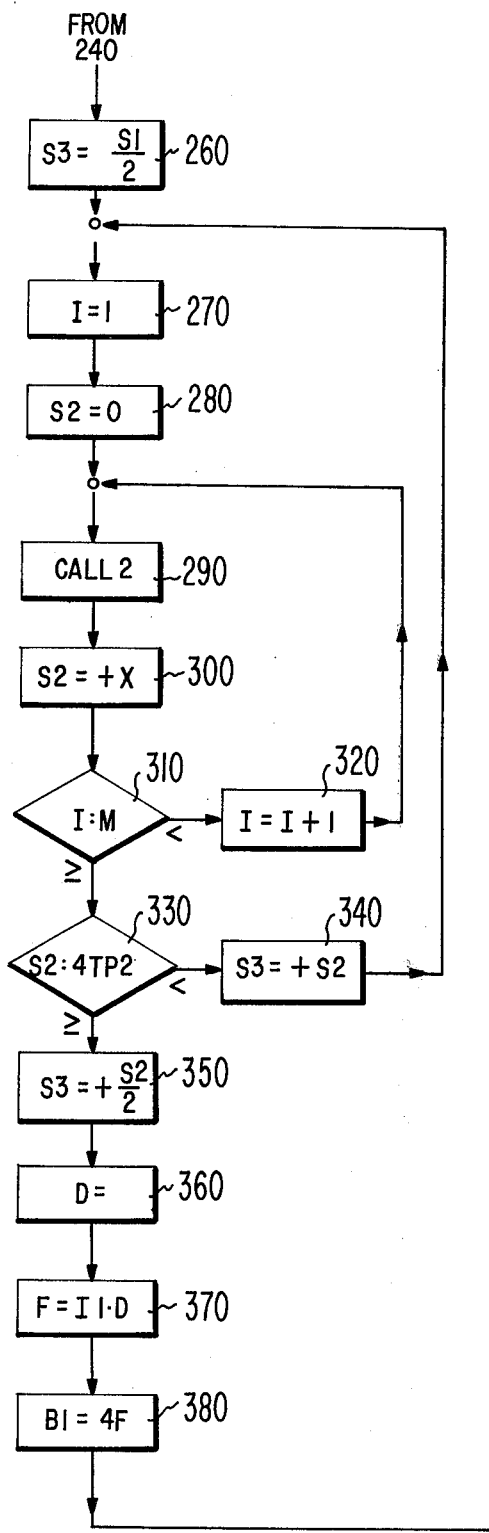
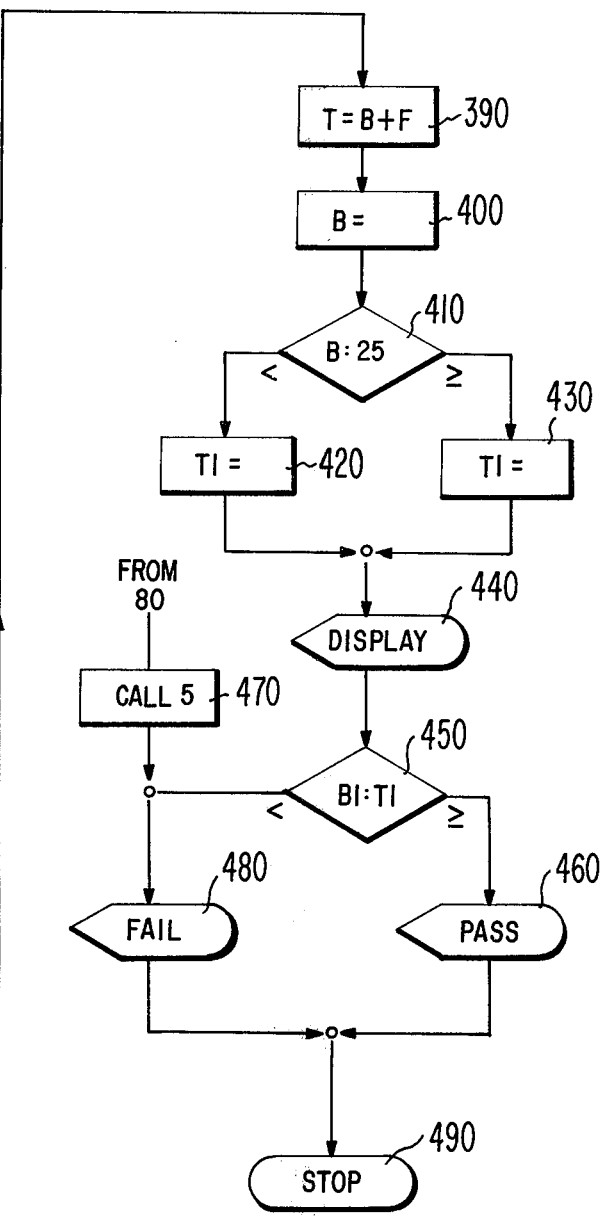
FIG. 7B

ENGINE BRAKE HORSEPOWER TEST WITHOUT EXTERNAL LOAD

The invention herein described was made in the course of or under contract or subcontract thereunder with the Department of the Army.

BACKGROUND OF THE INVENTION

In the course of testing an internal combustion engine, it is known to inhibit the ignition of one or more cylinders in order to determine the contribution of such cylinder or cylinders to the total performance of the engine. An analysis of the resulting engine performance, e.g., variations in engine speed as obtained from a tachometer, reflects either individually, or as compared to other cylinders, mechanical operating conditions within the cylinders. However, these tests are normally conducted at a relatively low throttle setting such as at idle or fast idle conditions on an unloaded engine. An attempted extension of these techniques to nondestructive full throttle engine operation presents operational problems or hazards for both the vehicle and the mechanic.

Moreover, meaningful operational and diagnostic testing of the overall performance of internal combustion engines requires that tests include operation at or nearly at full fuel and air flow conditions, thereby exercising fuel and air intake systems at full capacity. Further, combustion chamber pressures must reach the relatively high, full-load or peak value in order for the presence of a malfunction to be more readily detected. If, however, the amount of fuel or air-fuel mixture delivered to an internal combustion engine, operating without a load, is increased beyond that required for maximum speed, the engine will overspeed. Further, if an engine is allowed to accelerate until it overspeeds, mechanical damage may result for the reason that the centrifugal and inertial forces on the moving parts exceed their designed values in this forbidden mode of operation. Moreover, an unloaded engine will overspeed long before the maximum fuel and air flow values are reached. Accordingly, to permit performance testing under these conditions a load must be connected to the engine under test.

In U.S. Pat. No. 3,757,570 to Richard T. Cowley and Leonard R. Hulls, and U.S. Pat. No. 3,757,571 to George A. Chamberas, both issued on Sept. 11, 1973, and assigned to the same assignee as the present invention, there are disclosed methods and apparatus for providing a simulated load for internal combustion engines. The simulated load is effected by periodically interrupting or inhibiting the engine ignition to reduce the total power of the engine to a value equal to the frictional horsepower at a desired speed. In pending application Ser. No. 346,671 filed on Mar. 30, 1973, now U.S. Pat. No. 3,839,907, issued on Oct. 8, 1974, by R. E. Hanson and H. E. Fineman an internal combustion engine is loaded in accordance with the teachings of the above-identified patents, making use of appropriate control interlocks to produce a simple operational test which protects the vehicle engine from possible inadvertent overspeed conditions, while associated apparatus analyzes the performance of the engine. The analyzer comprises means coupled to the ignition system for inhibiting the occurrence of ignition during a predetermined proportion of successively occurring ignition periods to provide a simulated load to said engine equivalent to a given actual load corresponding to given throttle setting of the resulting engine speed, between the minimum and maximum speed values, without applying an external load. The predetermined proportion of successively occurring ignition periods is selected to ostensibly provide a resulting nominal speed which is determined by the normal operating characteristics of the engine. Means are provided for detecting the actual speed of the engine which results from inhibiting the occurrence of the ignition during the predetermined proportion of the successively occurring ignition periods. Means coupled to the detecting means compare the detected actual speed of the engine to a reference speed related to the nominal speed to provide an output corresponding to the departure of the actual speed from the reference speed. Indicating means responsive to the output of the comparing means are provided for indicating the disparity between the acutal speed and the reference speed.

SUMMARY OF THE INVENTION

According to an example of the present invention, the full load brake torque and horsepower of an engine is determined without connecting an external load to the engine. The engine is operated with all but one out of $n$ successive ignitions inhibited, so that the engine power equals the internal frictional load of the engine at an equilibrium speed. The brake torque of the engine at the equilibrium speed is $n - 1$ times the friction torque. The friction torque is determined from the known inertia of the engine and the rate of deceleration when all ignitions are inhibited. Brake horsepower is determined from brake torque and speed.

THE DRAWINGS

Figure 1:
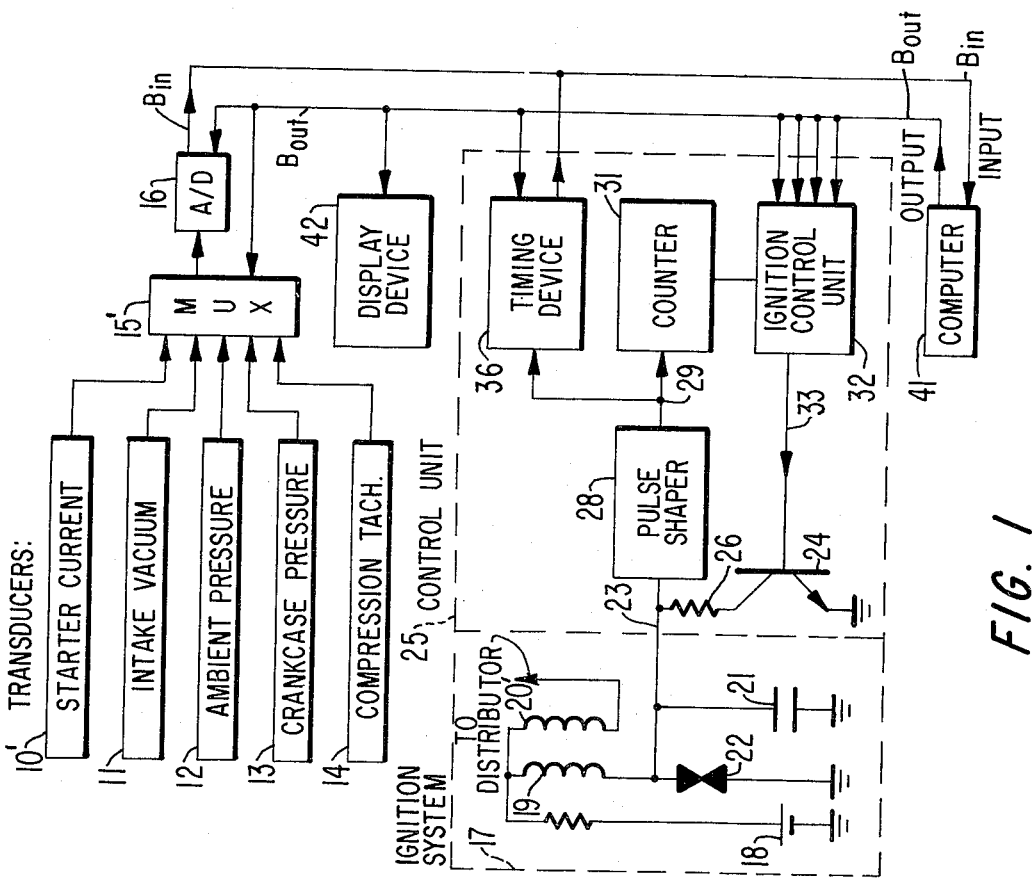
FIG. 1 is a diagram of a system for performing tests of an internal combustion engine.
Figure 5:
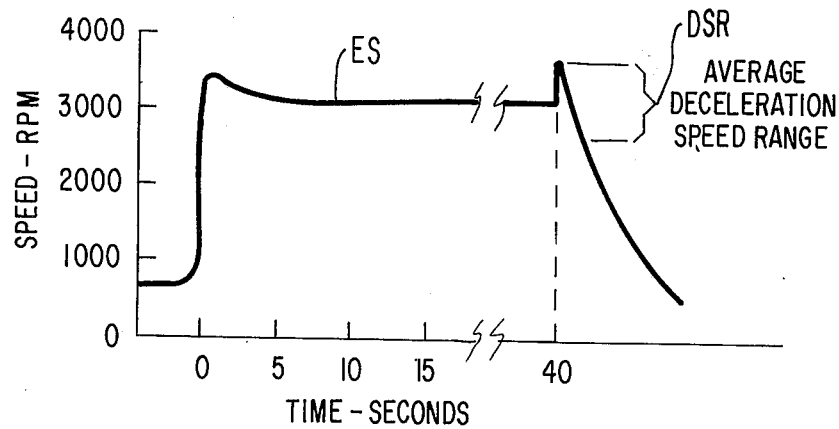
Figure 7A:
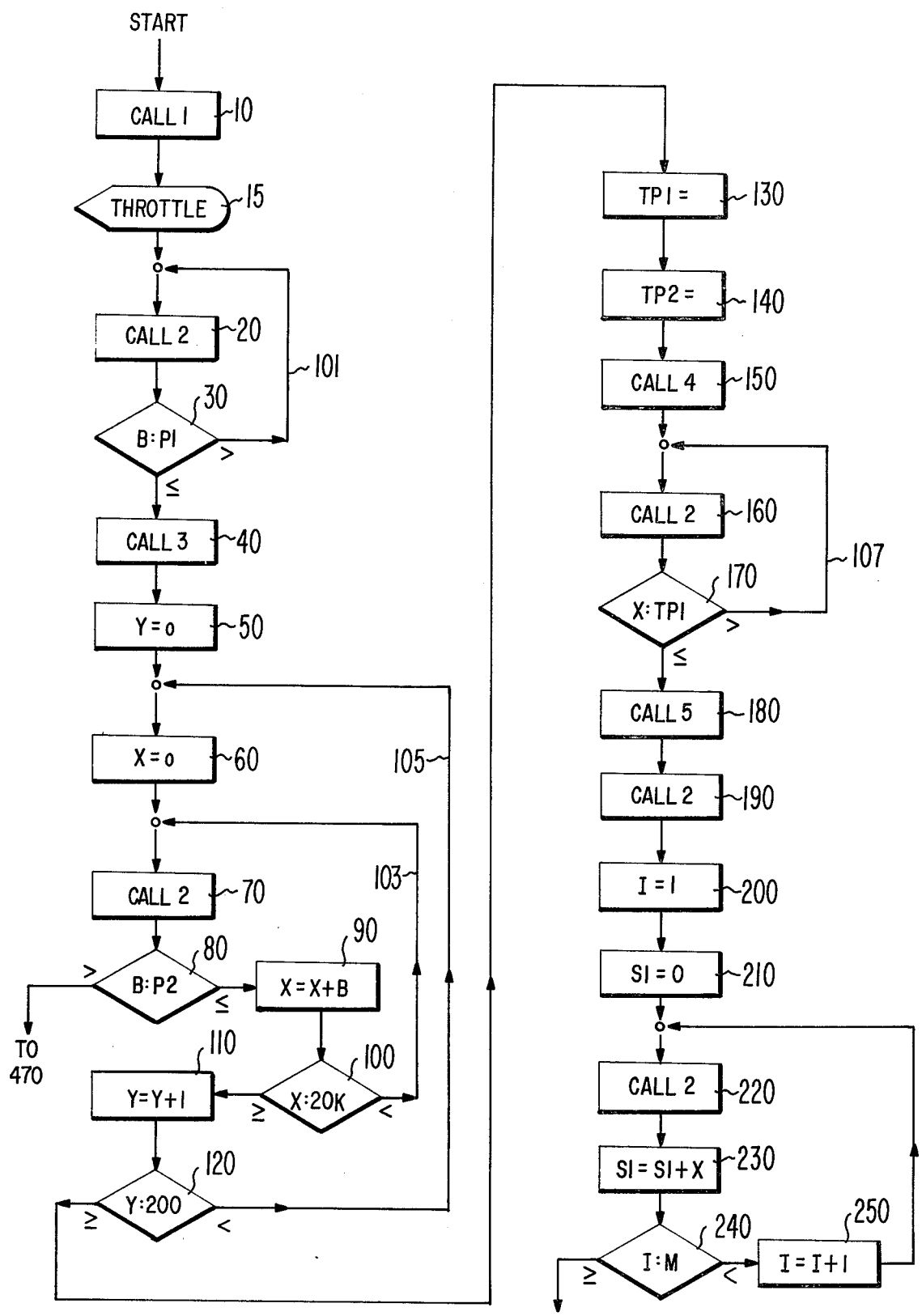

FIG. 5 is a chart showing the speed vs. time characteristic of an internal combustion engine during a test to determine brake horsepower; and FIG. 6 is a chart of time periods between successive openings of the ignition timing points during the engine acceleration and deceleration test sequence; and FIGS. 7A and 7B show a flow chart describing the sequence of operations performed by the computer in the system of FIG. 1.

DESCRIPTION OF PREFERRED EMBODIMENT

Referring now in greater detail to the drawing, FIG. 1 shows an internal combustion engine test system including a number of transducers physically connected to an engine (not shown). The transducers include a starter current transducer 10' providing the starter motor current waveform varying with time as the engine is cranked with ignition off. The current waveform can be used in the diagnosis of engine faults, the determination of cylinder compression, and the determination of ignition timing. An intake manifold vacuum transducer 11 is placed in the intake manifold, and an ambient pressure transducer 12 is provided at the test site to provide compensations for environmental conditions when testing engine compression. A crankcase blowby pressure transducer 13 is located on the engine crankcase for use in determining the conditions of the seals between pistons and cylinder walls. A compression ignition pulse tachometer transducer 14 is mounted on a diesel engine to produce pulses having a frequency proportional to engine speed.

The foregoing transducers, which are merely illustrative, have outputs coupled through a multiplexor 15' and an analog-to-digital converter to buses Bin and Bout. These elements are not described in greater detail because they are not a part of the present invention, but are mentioned solely to illuminate the system environment of the invention now to be described.

Apparatus for determining engine brake torque and brake horsepower according to the invention requires means to monitor the speed of the engine during a test procedure. Engine speed information may be obtained from the ignition system of a spark ignition engine much more simply and quickly than by physically attaching a tachometer to the engine. Portions of the ignition system 17 of an engine shown in FIG. 1 include a battery 18, an ignition coil primary winding 19, a secondary winding 20', a capacitor 21 and breaker points 22. The secondary winding 20' is connected at one end to primary winding 19, and is connected at its other end to the engine distributor (not shown), which is in turn connected to the engine spark plugs (not shown) in a conventional manner.

Although the invention is described in conjunction with a conventional engine and ignition system 17 utilizing breaker points and an ignition coil, it will be appreciated by those skilled in the art that the invention is applicable to other types of ignition systems such as an engine utilizing a capacitive-discharge or an electronic ignition system. Further, the invention is equally applicable to other types of engines such as diesel (compression ignition) engines, by appropriately coupling to their fuel insertion or injection systems.

Determination of engine brake horsepower is made by means of a control electronics unit 25 connected between the engine ignition system 17 and buses Bin and Bout, and by means of a computer 41 and a display device 42 both connected with the buses Bin and Bout. The control unit 25 includes a pulse shaper 28 which has an input line 23 connected across the ignition points 22 of the engine. The input circuit of pulse shaper 28 produces a square wave having leading edges coinciding with closings of the points, and having trailing edges coinciding with openings of the points. The output of pulse shaper 28 is a pulse train suitable for application to a counter 31 producing one output pulse for every five input pulses.

The output of counter 31 is applied to an ignition control unit 32 which operates under the control also of the computer 41 to apply a relatively-positive ignition inhibiting signal to the base input of an NPN transistor 24 having its output terminals and a low value resistor 26 connected across the engine ignition points 22. The ignition inhibiting signal causes the transistor 24 to conduct heavily and provide a short circuit across the ignition points. The ignition inhibiting signal has a duration equal to the period when four out of five successive ignitions would occur. The signal prevents the four successive ignitions in the engine cylinders by preventing the magnetic field in the primary winding 19 from collapsing, so that there are no spark potentials transmitted to the engine spark plugs. This inhibition of ignitions does not interfere with the operation of the pulse shaper 28 in generating a pulse every time the ignition points open.

Figure 2:
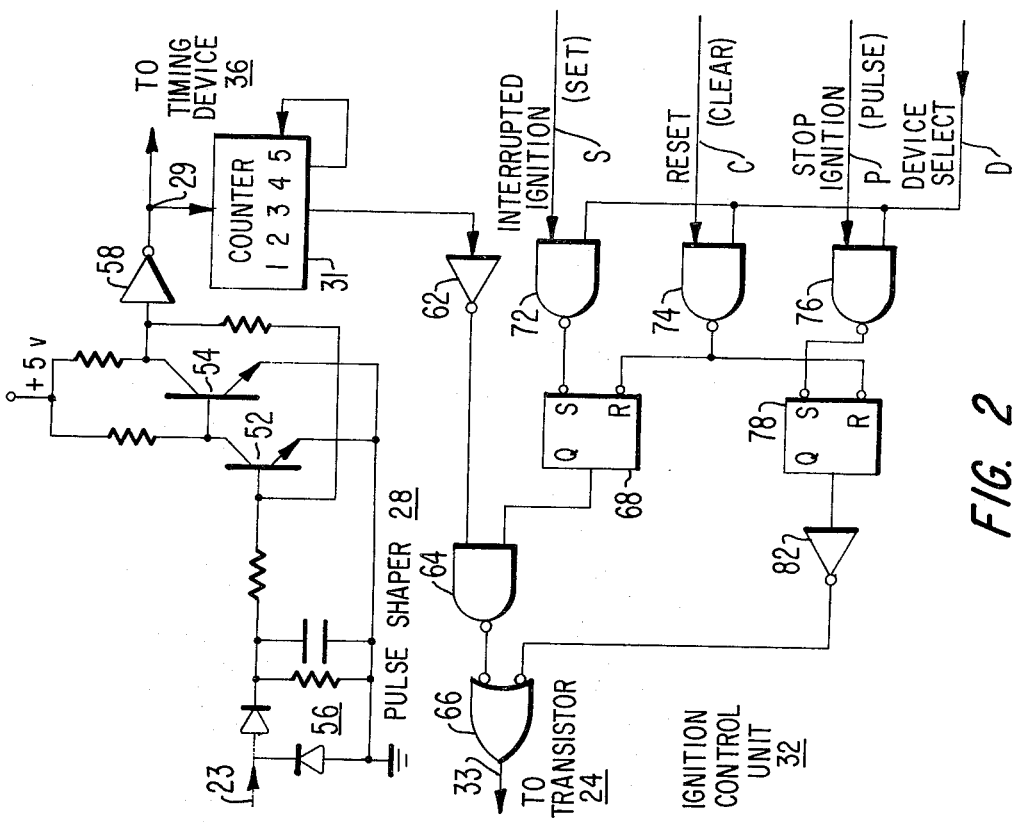
FIG. 2 is a circuit diagram of the pulse shaper, counter and ignition control unit in the system of FIG. 1.

Reference is now made to FIG. 2 showing in greater detail the circuits in pulse shaper 28, counter 31 and ignition control unit 32. The pulse shaper 28 is simply a threshold amplifier and clipper including transistors 52 and 54 which produces a zero volts output when the input signal is below 0.7 volts, and produces a 5 volts output when the input signal is above 0.7 volts. The input circuit 56 is designed to filter out negative voltage spikes occurring when the ignition points initially open. The points are open for about as long as they are closed, so that the output wave at 29 from an inverter 58 at the output of the pulse shaper 28 is a square wave having substantially equal positive and negative half cycles.

Figure 3:
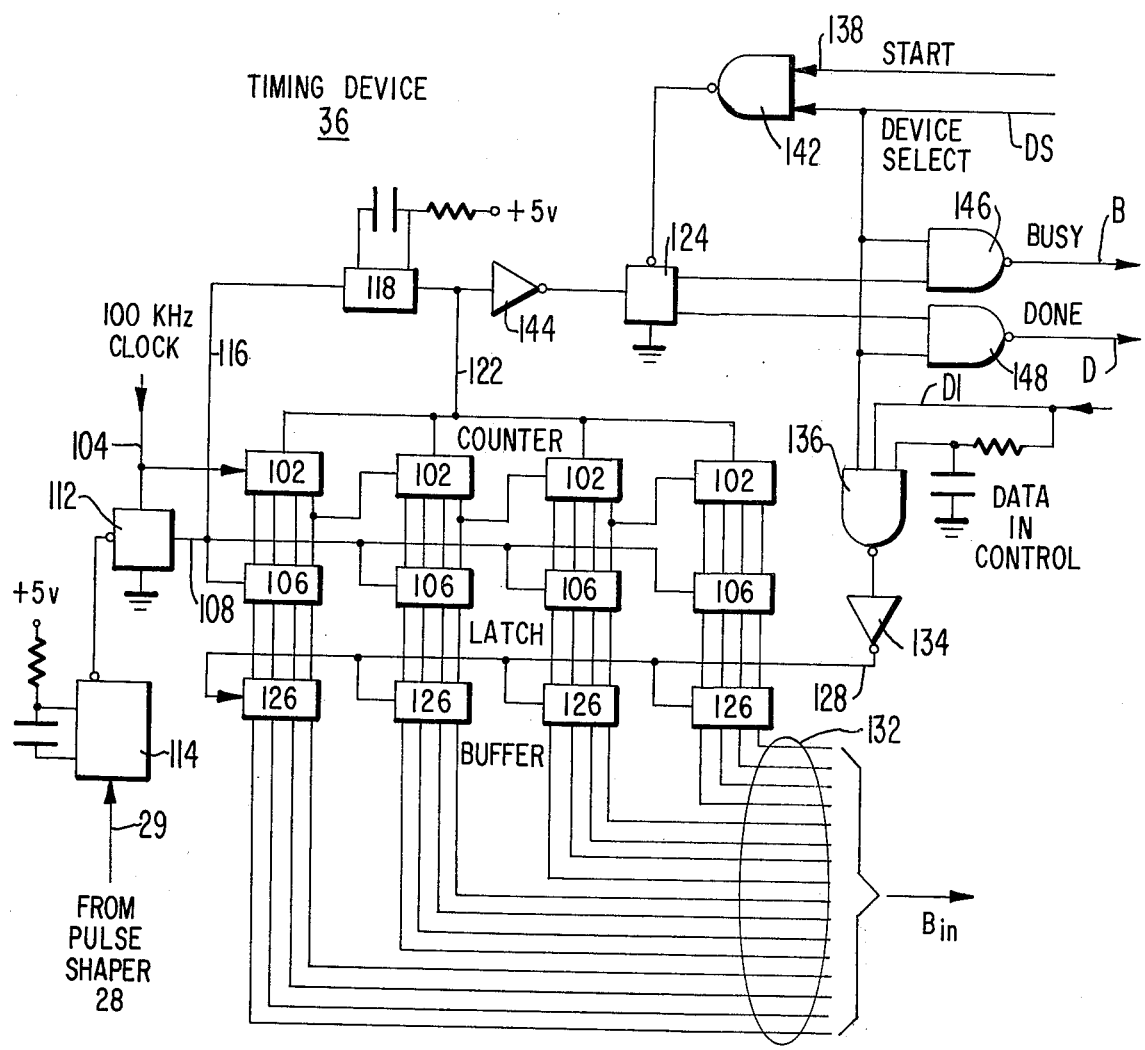
FIG. 3 is a circuit diagram of the timing device in the system of FIG. 1.

The output 29 of the pulse shaper 28 is connected to timing device 36 shown in FIG. 3 and to a counter 31 in FIG. 2. The counter 31 is conventional and has its terminals connected to provide a positive pulse train from inverter 62 with a logic 1 pulse every 5th firing cycle starting at one points closing and ending at the next points closing so that as to straddle an intermediate points opening ignition time.

The pulse train is passed through the nand gate 64 and the nor gate 66 to the transistor shorting the ignition system only when the nand gate 64 is enabled by an output from flip-flop 68. The flip-flop is enabled by the output of nand gate 72 when the gate is receptive to a "set" interrupted ignition signal and a "device select" signal from the computer 41 over lines S and D of the output bus Bout. Under these conditions, the pulse wave supplied to transistor 24 causes all but one out of $n$ ignitions in the engine to be inhibited, where $n$ is equal to 5 in the present example.

The computer 41 in the execution of its program subsequently supplies a reset or clear signal over line C and through nand gate 74 to the reset input of flip-flop 68. The gate 74 continues to be enabled by the device select signal over line D. Under these conditions, the flip-flop 68 is reset and the nand gate 64 is inhibited, with the result that there are no signals sent to transistor 24, and the engine operates with full uninterrupted ignition.

At a later time in the execution of the computer program, a stop ignition signal is applied over line P through enabled gate 76 to flip-flop 78. The output of the flip-flop is inverted by inverter 82 and passed freely through nor gate 66 to ignition-preventing transistor 24. Under these conditions, the engine decelerates with the ignition shorted out.

The control electronics unit 25 also includes a timing device 36 which receives pulses from pulse shaper 28, and which stores time periods under the control of the computer 41, and in a form useful to the computer. Reference is now made to FIG. 3 for a description in greater detail of the timing device 36.

The timing device includes a 16-bit counter consisting of four 4-bit integrated circuits 102. The counter counts the pulses applied over line 104 from a 100 KHz clock (not shown). The 16 outputs from the counter are coupled to the 16 stages of a count latch consisting of integrated circuits 106. The count latch 106 receives and holds the count in counter 102 when enabled by a transfer signal on line 108 from a transfer latch 112. The transfer latch 112 receives relatively infrequent pulses having a duration greater than the 10 $\mu$sec duration of one cycle of the 100 KHz clock from a one-shot multivibrator 114, which responds to input pulses on line 29 from the pulse shaper 28.

The pulses from the pulse shaper correspond with ignition points openings in the engine distribution. Every time there is a points opening pulse, the transfer latch 112 causes the count in counter 102 to be transferred to count latch 106. At the same time, the transfer latch 112 provides an output over line 116 to a time delay one-shot multivibrator 118 which applies a counter reset signal over line 122 to the counter 102, and applies a "done" signal to a third latch 124. In the timing unit as thus far described, the counter 102 counts pulses from the 100 KHz clock until a points opening pulse is received from pulse shaper 28. Then the count is tranferred from the counter to the count latch 106, and the counter is reset and continues counting until the next points opening signal is received. The count in the count latch always represents the time period between the last two previous points openings.

The timing unit 36 also includes a 16-bit buffer, consisting of four integrated circuits 126, which can be enabled over line 128 to transfer the 16-bit count in count latch 106 to the computer 41 via the 16-conductor data bus /32 forming part of the input bus Bin. The buffer 126 is enabled by a signal through inverter 134 from nand gate 136. Gate 136 provides an output when it receives both a device select signal over line DS from the computer and a "data in" control signal over line DI from the computer. In this way the computer periodically receives the count which represents the time period between the last two points openings, and consequently represents the speed of the engine during that interval.

The timing device is initialized by the computer 41 by a "start" signal applied over line 138 to a nand gate 142, simultaneously with a device select signal over line DS. The output of gate 142 causes the third latch 124 to assume a "busy" state. The latch 124 remains in the busy state until set to the "done" state by a signal through inverter 144 from the one-shot 118 when the count in counter 102 is transferred to the count latch 106.

The busy or done status of the timing unit is available to the computer 41 through lines B and D whenever the gates 146 and 148 are enabled by a device select signal on line DS from the computer.

In summary, the timing device 36 continually measures and latches the time periods between successive points openings pulses and sets its own state to done each time a time period is stored. The computer can then cause a transfer of the stored count in the latch through the buffer to the computer. The computer sets the timing device to the busy state whenever continued measuring of time periods is needed.

The timing unit 36 is not needed if the computer 41 employed includes a real time clock, and the program for the computer causes the computer to perform the time period measuring and storing function performed by the timing unit 36.

The computer 41 may, by way of example only, be a "Nova 1200" minicomputer manufactured and sold by Data General Corporation, Southboro, Massachusetts, Zip 01772. The Nova 1200 is a low cost minicomputer designed for general purpose applications. It has a 16-bit word, multi-accumulator central processor, and a full memory cycle time of 1200 nanoseconds. It executes arithmetic and logical instructions in 1350 nanoseconds. The entire Nova 1200 central processor fits on a single 15-inch-square printed circuit subassembly board. The basic computer includes 4000 16-bit words of core memory, a Teletype interface, programmed data transfer, automatic interrupt source identification, and a direct memory access channel. User programming conveniently can be in the BASIC language.

The display device 42 for use with the Nova 1200 computer may be a conventional Teletypewriter, a printer, a 4-digit display such as one including Numitron character display tubes, or any other similar display device.

Figure 4:
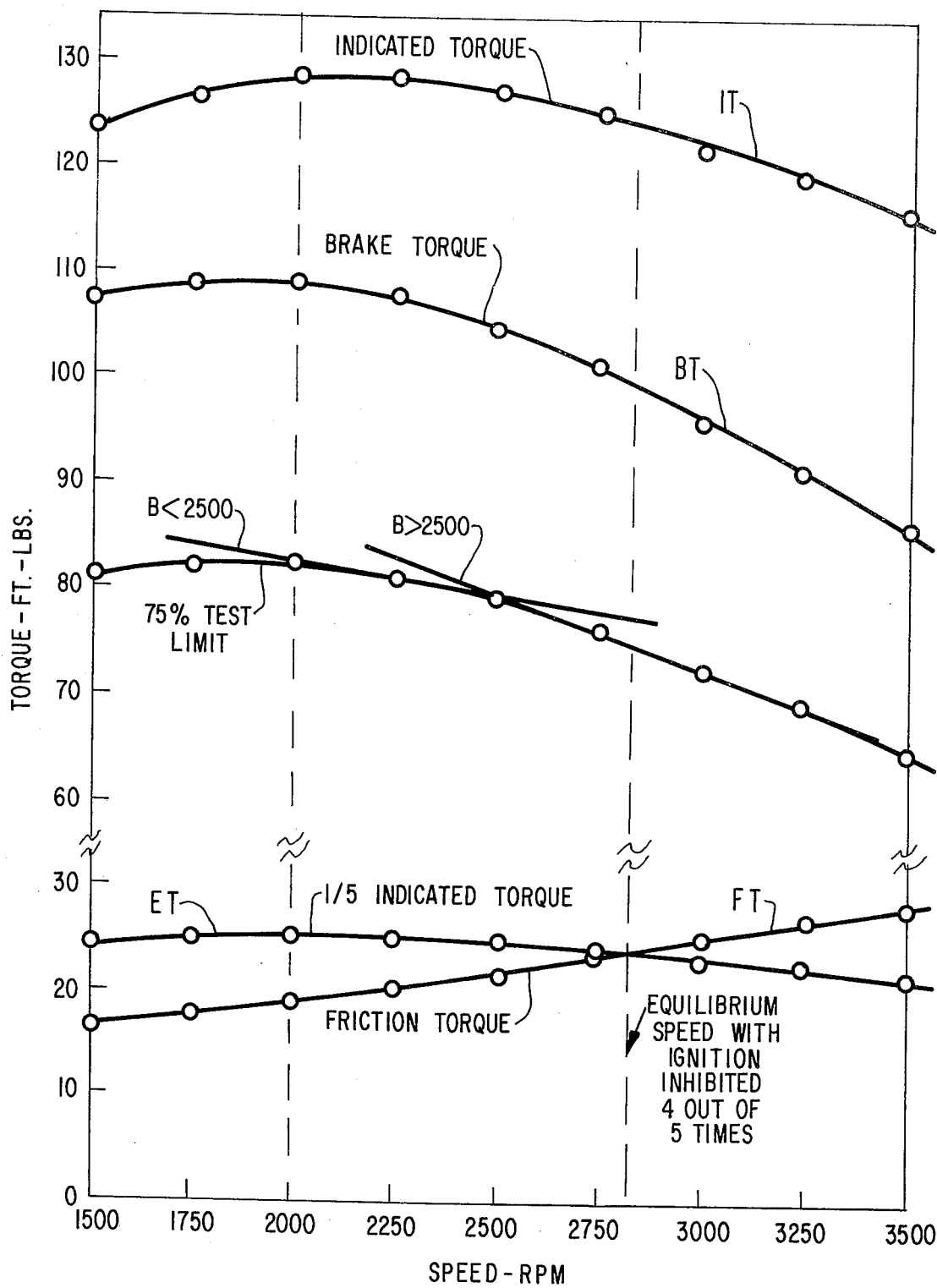
FIG. 4 is a chart showing the torque vs. speed characteristic of an internal combustion engine.

Reference is now made to FIG. 4 for a description of the variations in engine horsepower and torque with engine speed. Horsepower is equal to torque in foot pounds multiplied by speed in radians per second and divided by 550. The torque of an engine is low at low engine speeds, increases to a maximum at a high engine speed, and then decreases at higher engine speeds. The brake horsepower or torque of an engine is that which is effective to drive a load such as a vehicle or a dynamometer. The engine actually produces an additional horsepower or torque which is necessary to overcome frictional losses in the engine itself. This is shown in FIG. 4 where the total or indicated torque IT of a Type M151A2 jeep engine over a plotted speed range of 1500 to 3500 rpm is equal to the brake torque BT plus the friction torque FT. Of course, the useful output of the engine is represented by the brake torque, and it is the brake torque (or brake horsepower) which is the useful test output information normally provided by a very large and very expensive dynamometer test apparatus physically connected as a load on the engine under test.

According to this present invention, the brake torque and brake horsepower of an engine is determined without connecting an external load to the engine. Instead, a certain major proportion of the ignition firings of the engine are inhibited so that the full throttle power output of the engine is just sufficient to operate the engine at an equilibrium speed at which the internal frictional losses in the engine are balanced. In the example described in FIG. 4, a four-cycle engine having 4 out of 5 ignition firings inhibited has a full-throttle equilibrium speed of about 2775 rpm. At the equilibrium speed, the indicated torque IT is equal to 5 times the friction torque FT, and the brake torque BT is equal to 5 minus 1, or 4, times the friction torque FT. The friction torque is determined from the rate of deceleration of the engine when all ignition firings are inhibited, and the inherent inertia of the engine. The inertia of an engine is an important design factor in an engine and is a number available from the engine manufacturer.

FIG. 5 shows typical speed changes gone through in determining brake horsepower without use of an external load. The engine is initially at a slow idle, and at time 0 seconds is full-throttle accelerated to about 3500 rpm, at which time 4 out of 5 ignition firings are inhibited. The engine speed then settles down to an equilibrium speed ES of about 3100 rpm at which the engine power output equals the internal frictional losses of the engine. After 40 seconds, full ignition is restored to cause the engine to accelerate to a speed about 500 rpm above the equilibrium speed. Then the ignition is completely inhibited and the engine decelerates through the deceleration speed range DSR to a speed about 500 rpm below the equilibrium speed at a rate determined by the frictional losses and the inherent inertia of the engine. Deceleration time measurements are used in the calculation of the friction torque and horsepower, which are multiplied by an appropriate factor to provide the brake torque and horsepower.

The acceleration of the engine from the equilibrium speed ES in FIG. 5 and the subsequent deceleration through the range DSR permits an accurate measurement of deceleration rate as the speed goes down through the equilibrium speed. According to a somewhat simpler and sometimes sufficiently accurate procedure, the engine is not accelerated, but is simply decelerated from the equilibrium speed. The deceleration rate of the engine is then measured in the speed range immediately below the equilibrium speed ES. An empirically-determined correction factor can be applied to the deceleration rate if extra accuracy is desired.

FIG. 6 shows measured time periods between ignition timing pulses obtained from distributor points opening during the course of an actual test for determining the brake horsepower of an engine. The time period between successive pulses is a measure of the engine speed at that time. The time periods vary inversely with engine speed. The chart of FIG. 6 shows a time period of 1250 xoten microsecond units corresponding with the time period between successive points openings after the engine has been operated 40 seconds and has settled down to an equilibrium speed of 2400 rpm. During this time period, the ignition control unit 32 is made to cease inhibiting ignitions, so that the engine accelerates during the following several time periods until a time period of 1033 microseconds is detected which corresponds with a speed of about 500 rpm above the equilibrium speed of 2400 rpm.

During the following time period of 1011 microseconds, the ignition control unit 32 turns off the ignition to the engine so that it decelerates continuously to a time period between successive points openings of 1631 microseconds, corresponding with a speed of about 500 rpm below the equilibrium speed of 2400 rpm. It may be noted that during deceleration of the engine, four successive time periods are considered to be the time period of a complete engine cycle, since the engine is a four-cylinder engine. By making the time measurements in terms of engine cycles, possible inaccuracies due to variations in instantaneous engine speed, due to variations in performance of the individual cylinders, are avoided.

Reference is now made to the computer program flow chart of FIGS. 7A and 7B for a brief description of the steps gone through in determining the brake torque and brake horsepower of an engine under test. The first step 10 of the program is the execution of a CALL 1 subroutine by the computer 41 which initializes the timing device 36 in the control unit 25 in FIG. 1, and shown in detail in FIG. 3, in a manner previously described. The timing device 36 receives ignition points openings pulses from the engine and registers the time periods between successive pulses as a measure of engine speed at that time.

The second step 15 of the program causes the display by the computer on display device 42 of the words "FULL THROTTLE" indicating to the test operator that the system is ready for him to apply full throttle to the engine. Step 20 is the execution of a special subroutine CALL 2, B by which the time period B between the last two points openings of the engine is transferred from the timing device 36 to the computer 41. Step 30 compares the time period B with a time period P1 corresponding with an engine speed at which the ignition control unit 32 should inhibit 4 out of 5 ignition firings. If the speed has not yet been reached, the program returns over path 101 to step 20. Otherwise, the program continues to step 40, a CALL 3 subroutine which activates the ignition control unit 32.

Steps 50 through 120 merely produce a delay to the time marked 40 seconds in FIG. 5 by going through a 200 millisecond delay 200 times via paths 103 and 105. At the end of the 40 seconds, the time period B supplied to the computer 41 corresponds with the eqilibrium speed at which the power output of the ignition-inhibited engine just equals the frictional horsepower of the engine.

Steps 130 and 140 calculate the time period TP1 corresponding with 500 rpm above the equilibrium speed, and time period TP2 corresponding with 500 rpm below the equilibrium speed.

Step 150 is a CALL 4 subroutine which causes a discontinuance of ignition interruption by ignition control unit 32. This causes the engine speed to increase. The program loops around through steps 160, and 170 and path 107 until the engine speed reaches 500 rpm above the equilibrium speed, at which time a step 180 subroutine CALL 5 causes the ignition control unit to inhibit all firings in the engine. The engine then starts decelerating and steps 190 through 250 cause the determination of the time period S1 of the first full engine cycle (four ignitions in the 4-cylinder engine) when the engine starts decelerating. Step 260 takes half of S1 and puts it in accumulator S3.

Steps 270 through 350 also accumulate in S3 the following time periods between full cycle sets of ignitions as the engine decelerates toward 500 rpm below the equilibrium speed, and also one half of the final full cycle time period S2, all as illustrated in the chart of FIG. 6.

Step 360 is the calculation of the deceleration rate D from the formula: $D = [40\pi(1/S1 - 1/S2) 10^{10}]/S3$ radians per second per second.

Step 370 is the calculation of the frictional torque FT in foot pounds at the equilibrium speed from the formula $FT = I1$ times $D$, where $I1$ is the known rotational moment of inertia of the engine, and $D$ is the deceleration rate from step 360.

Step 380 is the calculation of engine brake torque BT in foot pounds at the equilibrium speed from the formula $BT = 4$ times $FT$, where the multiplier 4 is used when 4 out of 5 ignitions are inhibited.

Step 390 is the calculation of engine indicated torque in foot pounds from the formula $IT =$ friction torque FT plus brake torque BT.

Step 400 is the calculation of equilibrium speed in rpm. from the formula Speed $= (0.3 \times 10^7)/B$ where $B$ is from step 70 and is the time period between the last two ignition points openings pulses when the engine is at the equilibrium speed.

Steps 410, 420 and 430 compute the brake torque test limit for the test from the two approximation lines B<2500 rpm and B>2500 rpm in FIG. 4.

Step 440 is the display on display device 42 of the computed values of friction torque FT, brake torque BT, total or indicated torque IT, and equilibrium speed B.

Step 450 compares engine brake torque BT (or B1) from step 380 with test limit T1 from steps 420 and 430. If brake torque is greater than T1, step 460 displays Test Passed on display device 42 and program ends at 490. If brake torque is less than T1, step 480 displays Test Failed on display device 42 and program ends at 490. A Test Failed display is also produced by step 470 if step 80 indicated that the equilibrium speed B was below an acceptable value.

If the value of brake horsepower is desired it is obtained by multiplying brake torque in foot pounds by speed in radians per second and dividing by 550.

There follows a more detailed description of the steps 10 through 490 of the program flow chart of FIGS. 7A and 7B.

| No. | Program Flow Chart<br>Statement and Function |
|---|---|
| 10 | CALL 1. Execute special subroutine number 1 which sends a start pulse (*IOS*) to the Timing Device. This sets the device to the Busy state indicating that it is Busy measuring new data. |
| 15 | DISPLAY "FULL THROTTLE". Output a display message to indicate that is time to start the test by fully depressing the throttle. |
| 20 | CALL 2, B. Execute special subroutine number 2 which checks the state of the Timing Device and waits for it to be in the Done State ($\overline{SELB}$ at logic "1" or $\overline{SELD}$ at logic "0"). When this condition is sensed, new time period data is available which the computer inputs as parameter B. A start pulse is then executed to return the device to a Busy state, indicating that it is busy measuring the time period to the next pulse. |
| 30 | IF B>P1 THEN GO TO 20. Compare parameters B and P 1, if B is greater than P1 then return to statement 20. When B is less than or equal to P1 the speed is high enough to start the test so the program continues on to the next statement. |
| 40 | CALL 3. Execute special subroutine number 3 which outputs an *IOS* pulse to the Ignition control unit. This turns on the unit which wll inhibit n −1 out of n firings (4 out of 5 as used so far) until the unit is reset by CALL 4 instruction. The vehicle should now be at full throttle condition if the operator has followed proper operating procedure. |
| NOTE: | Statements 50 through 120 merely produce a 40 second delay (unless speed drops below lower limit) by producing a 200 msec delay loop 200 times. |
| 50 | Y = 0. Set the value of parameter Y to zero. This parameter will be used to count the 200 delay loops. |
| 60 | X = 0. Set the value of parameter X to zero. This parameter will be used to accumulate 200 msec of delay time. |
| 70 | CALL 2, B. Same as statement 20 - Wait for next pulse and then input time period as parameter B. |
| 80 | If B>P2 THEN GO TO 470. Compare parameters B and P2, if B is greater than P2 then branch to statement 470. This is a lower speed limit test which checks to see if the speed has dropped below the lower speed limit, if so the test is automatically failed and the program branches to the end of the program to inhibit the ignition and display the results. |
| 90 | X = X + B. Add the new value of B to the present value of X and store the result as X. |
| 100 | If X<20,000 THEN GO TO 70. Compare parameter X to 20,000 if X is less than 20,000 then go back to statement 70 (and take another measurement because 200 msec has not elapsed yet); otherwise continue on to statement 110. |
| 110 | Y = Y + 1. Add 1 to the value of Y and store the result as Y. (This step is counting the 200 msec delay loops). |
| 120 | IF Y<200 THEN GO TO 60. Compare parameter Y to 200, if it is less than 200 then go back to statement 60 (and make another 200 msec delay); otherwise continue on to statement 130. |
| NOTE: | At this point the interrupt test has been run for 40 seconds without the speed dropping below the lower speed limit. The sysem will next proceed with the transient power test by measuring the deceleration rate centered around the equilibrium speed as indicated by the last time period measurement, B. |
| 130 | TP1 = 6000B/(6000 + B). Calculate the value of the quantity 6000B/(6000 + B) and store the result as TP1 (equivalent to the time period measurement that would be made at 500 RPM above the equilibrium speed). |
| 140 | TP2 = 6000B/(6000 − B). Calculate the value of the quantity 6000B/(6000 − B) and store the result as TP2 (equivalent to the time period measurement that would be made at 500 RPM below the equilibrium speed). |
| 150 | CALL 4. Execute special subroutine number 4 which sends an reset pulse (*IOC*) to the Ignition Control |

-continued

| No. | Program Flow Chart<br>Statement and Function |
|---|---|
|  | Unit. After execution of this instruction no ignition firings are inhibited. |
| 160 | CALL 2, X. Same as statement 20 except after waiting for next pulse, then input new time period as parameter X. |
| 170 | IF X >TP1 THEN GO TO 160. Compare parameters X and TP1; if X is greater than TP1, then go back to statement 160. Otherwise continue on to statement 180 since speed is now 500 RPM or more above equilibrium speed. |
| 180 | CALL 5. Execute special subroutine number 5 which sends an *IOP* pulse to the Ignition Control Unit. After execution of this instruction all ignition firings are inhibited. |
| 190 | CALL 2, X. Same as instruction 160 - wait for next pulse and then input time period measurement as parameter X. This instruction delays the program for one inhibited firing to insure that deceleration has started before beginning deceleration rate measurement. |
| 200 | I = 1. Set the value of parameter I to 1. This parameter is used to count firings (points openings) for accumulating the time period for a full engine cycle. |
| 210 | S1 = 0. Set the value of parameters S1 to 0. This parameter is used to count firings for accumulating the time period for a full engine cycle of the deceleration rate measurement. |
| 220 | CALL 2, X. Same as instruction 160. Wait for next pulse and then input time period measurement as parameter X. |
| 230 | S1 = S1 + X. Add the value of X to the present value of S1 and store the result as S1. |
| 240 | IF I>M, THEN GO TO 260. Compare parameters I and M; if I is greater than or equal to M, then branch to statement 260. Otherwise continue on to statement 250. |
| 250 | I = I + 1. Add 1 to the value of I and store the result as I. |
| 255 | GO TO 220. Branch back to statement 220 (to input another time period measurement). |
| 260 | S3 = S1/2. Calculate the value of the quantity S1/2 and store the result as S3. |
| NOTE: | S3 will be used to accumulate the time period between the first and last full engine cycles of the deceleration rate measurement, plus half of the time period for each of these engine cycles. S3 now has half of the time period for the first engine cycle stored in it. |
| 270 | I= 1. Set the value of parameter I to 1. |
| 280 | S2 = 0. Set the value of parameter S2 to 0. |
| NOTE: | Statements 290 through 325 are used to obtain the time period for another full engine cycle in phase with previously measured cycles. |
| 290 | CALL 2, X. Same as instruction 160 - wait for next pulse and then input time period measurement as parameter X. |
| 300 | S2 = S2 + X. Add the value of X to the present value of S2 and store the result as S2. |
| 310 | If I >= M THEN GO TO 330. Compare parameters I and M; if I is greater than or equal to M, then branch to statement 330. Otherwise, continue on to statement 320. |
| 320 | I = I + 1. Add 1 to the value of I and store the result as I. |
| 325 | GO TO 290. Branch back to statement 290 (to input another time period measurement). |
| 330 | IF S2 >=4*TP2, THEN GO TO 350. Calculate the value of the quantity 4 (TP2) and then compare the result to S2, if S2 is greater than or equal to this value branch to statement 350. Otherwise, continue on to statement 340. |
| 340 | S3 = S3 + S2. Add the value of S2 to the present value of S3 and store the result as S3. |
| 345 | GO TO 270. Branch back to statement 270 (to accumulate another full engine cycle time period measurement). |
| 350 | S3 = S3 + S2/2. Calculate the value of the quantity S3 + S2/2 and store the result as S3. S3 now contains the full time period to be used for the deceleration rate calculation. |
| 360 | D = 4*3.1416*(1/S1 − 1/S2)*10↑10/S3. Calculate the value of the quantity $$\frac{4\pi(\frac{1}{S1} - \frac{1}{S2})10^{10}}{S3}$$ and store the result as D. This value will be the value of the deceleration rate in radians/sec². |
| 370 | F = I1*D. Calculate the value of the quantity I1(D) and store the result as F. Since I1 is the rotational moment of inertia of the engine, F is the friction torque in ft. lbs. of the engine at the equilibrium speed. |

-continued

Program Flow Chart

| No. | Statement and Function |
|---|---|
| 380 | $B1 = 4*F$. Calculate the value of the quantity $4(F)$ and store the result as $B1$. This value will be the engine brake torque output at the interrupt speed as long as the interrupt firing ratio is 1 out of 5 ($N = 5, N - 1 = 4$). |
| 390 | $T = B1 + F$. Calculate the value of the quantity $B + F$ and store the result as $T$. This value will be the indicated (or total) torque developed by the engine. |
| 400 | $B = 0.3*(10\uparrow 7)/B$. Calculate the value of the quantity $(0.3 \times 10^7)/B$ and store the result as $B$. By this calculation the parameter $B$ has been changed from the time period corresponding to the equilibrium speed to the actual equilibrium speed. |
| NOTE: | The next statements (410 through 430) simply calculate the brake torque test limit, $T1$. |
| 410 | If $B >= 2500$ THEN GO TO 430. Compare the speed, $B$, to 2500, if it is greater than or equal to 2500 then branch to 430. Otherwise continue on to 420. |
| 420 | $T1 = 115.35 - 0.0143*B$. Calculate the value of the quantity $115.35 - 0.0143(B)$ and store the result as $T1$. |
| 425 | GO TO 440. Branch to statement 440. |
| 430 | $T1 = 93.5 - 0.0555*B$. Calculate the value of the quantity $93.5 - 0.0555(B)$ and store the result as $T1$. |
| 440 | DISPLAY $F, B1, T, B$. Display to the user the values of $F$ (friction torque), $B1$ (brake torque), $T$ (indicated torque), and $B$ (corresponding speed). |
| 450 | IF $B1 < T1$, THEN GO TO 480. Compare parameters $B1$ and $T1$ (brake torque and test limit), if $B1$ is less than $T1$ then jump to statement 480. Otherwise continue on to statement 460. |
| 460 | DISPLAY "TEST PASSED". Display the message "TEST PASSED" to the user. |
| 465 | GO TO 490. Jump to statement 490 (end of test) |
| 470 | CALL 5. Same as statement 180. This instruction is used to automatically stop the engine after the test was failed at statement 80. |
| 480 | DISPLAY "TEST FAILED". Display the message "TEST FAILED" to the user. |
| 490 | STOP. The test is complete, stop all processing. |

There follows an actual example of the sequence of program steps when the power test was run on a M151A2 military vehicle with a L141 engine. The example starts with step 130 following the 40 second delay during which the equilibrium speed has been determined.

SAMPLE PROGRAM RUN

| Program Step | Data | Comments |
|---|---|---|
|  |  | 40 second delay over, $B = 1250$ which corrsponds to 2400 RPM |
| 130 | $TP1 = 1034$ | $TP1 = \dfrac{6000B}{6000 + B}$ |
| 140 | $TP2 = 1579$ | $TP2 = \dfrac{6000B}{6000 - B}$ |
| 150 |  | Turn off interrupter |
| 160 | $X = 1221$ |  |
| 170 | $X > TP1$ |  |
| 160 | $X = 1179$ |  |
| 170 | $X > TP1$ |  |
| 160 | $X = 1133$ |  |
| 170 | $X > TP1$ |  |
| 160 | $X = 1110$ | Engine accelerating 500 RPM |
| 170 | $X > TP1$ |  |
| 160 | $X = 1082$ |  |
| 170 | $X > TP1$ |  |
| 160 | $X = 1060$ |  |
| 170 | $X > TP1$ |  |
| 160 | $X = 1033$ |  |
| 170 | $X < TP1$ | Speed high enough |
| 180 |  | Turn on ignition inhibit |
| 190 | $X = 1011$ |  |
| 200 | $I = 1$ |  |
| 210 | $S1 = 0$ |  |
| 220 | $X = 1025$ |  |
| 230 | $S1 = 1025$ |  |
| 240 | $I < M$ | $M = 4$ for this example |
| 250 | $I = 2$ |  |
| 220 | $X = 1032$ |  |
| 230 | $S1 = 2057$ |  |
| 240 | $I < M$ |  |
| 250 | $I = 3$ |  |
| 220 | $X = 1039$ |  |
| 230 | $S1 = 3096$ |  |
| 240 | $I < M$ |  |
| 250 | $I = 4$ |  |
| 220 | $X = 1045$ |  |
| 230 | $S1 = 4141$ |  |
| 240 | $I = M$ | Full engine cycle of deceleration data taken |
| 260 | $S3 = 2070.5$ |  |
| 270 | $I = 1$ |  |
| 280 | $S2 = 0$ |  |
| 290 | $X = 1052$ |  |
| 290 | $X = 1060$ | Statements 300–330 omitted |
| 290 | $X = 1066$ |  |
| 290 | $X = 1072$ |  |
| 340 | $S3 = 6320.5$ |  |
| 290 | $X = 1079$ |  |
| 290 | $X = 1085$ | Statements 270, 280, and |
| 290 | $X = 1090$ | 300–330 omitted |
| 290 | $X = 1097$ |  |
| 340 | $S3 = 10671.5$ |  |
| 290 | $X = 1261$ |  |
| 290 | $X = 1270$ | Statements 270, 280 and |
| 290 | $X = 1280$ | 300–330 omitted |
| 290 | $X = 1290$ |  |
| 340 | $S3 = 39265.5$ |  |
| 290 | $X = 1299$ |  |
| 290 | $X = 1301$ | Statements 270, 280 and |
| 290 | $X = 1321$ | 300–330 omitted |
| 290 | $X = 1330$ |  |
| 340 | $S3 = 44516.5$ |  |
| 290 | $X = 1338$ |  |
| 290 | $X = 1349$ | Statements 270, 280 and |
| 290 | $X = 1361$ | 300–330 omitted |
| 290 | $X = 1372$ |  |
| 340 | $S3 = 49936.5$ |  |
| 290 | $X = 1382$ |  |
| 290 | $X = 1395$ | Statements 270, 280 and |
| 290 | $X = 1406$ | 300–330 omitted |
| 290 | $X = 1419$ |  |
| 340 | $S3 = 55538.5$ |  |
| 290 | $X = 1431$ |  |
| 290 | $X = 1444$ | Statements 270, 280 and |
| 290 | $X = 1456$ | 300–330 omitted |
| 290 | $X = 1469$ |  |
| 340 | $S3 = 61338.5$ |  |
| 290 | $X = 1481$ |  |
| 290 | $X = 1494$ | Statements 270, 280 and |
| 290 | $X = 1507$ | 300–330 omitted |
| 290 | $X = 1521$ |  |
| 340 | $S3 = 67341.5$ |  |
| 290 | $X = 1534$ |  |
| 290 | $X = 1548$ | Statements 270, 280 and |
| 290 | $X = 1562$ | 300–330 omitted |
| 290 | $X = 1576$ |  |
| 340 | $S3 = 73561.5$ |  |
| 290 | $X = 1589$ |  |
| 290 | $X = 1603$ | Statements 270, 280 and |
| 290 | $X = 1617$ | 300–330 omitted |
| 290 | $X = 1631$ |  |
| 300 | $S2 = 6440$ |  |
| 310 | $I = M$ |  |
| 330 | $S2 > 4$ (TP2) | No more input data required $(6440 > 6316)$ |
| 350 | $S3 = 76781.5$ | $S3$ now equals time used for deceleraton rate calculation |
| 360 | $D = 141.1$ | $S1 = 4141$ $S2 = 6440$ $S3 = 76781.5$ $D =$ deceleration rate in Radians/sec$^2$ |
| 370 | $F = 21.165$ | $I1 = 0.15$ ft. lb. sec$^2$ for this example ($L141$ engine), $F =$ friction torque in ft. lbs. |
| 380 | $B1 = 84.66$ | $B1 =$ Output brake torque capability in ft. lbs. |
| 390 | $T = 105.825$ | $T =$ Indicated torque capability in ft. lbs. |
| 400 | $B = 2400$ | $B$ now equals final interrupt speed in RPM |
| 410 | $B < 2500$ |  |
| 420 | $T1 = 81.03$ | $T1$ is test limit which correspond to 25% loss of power from nominal |
| 440 | Display torque and speed values |  |
| 450 | $B1 > T1$ | Less than 25% loss of power in |

-continued

SAMPLE PROGRAM RUN

| Program Step | Data | Comments |
|---|---|---|
| | | this example |
| 460 | Display "Test Passed" | |
| 490 | STOP | End of Test |

What is claimed is:

1. Apparatus for testing an internal combustion engine, comprising
   means to operate the engine at an equilibrium speed determined by friction torque with all but one of n ignitions inhibited,
   means to decelerate the engine without any ignition, and
   means to measure the average rate of deceleration of the engine during a predetermined deceleration speed range including the equilibrium speed,
   whereby the brake torque of the engine is obtained by multiplying the average rate of deceleration by the known inertia of the engine and by $n-1$.

2. Apparatus according to claim 1, and in addition, means to multiply the average rate of deceleration by the known inertia of the engine and by $n-1$ to obtain the brake torque of the engine at the equilibrium speed.

3. Apparatus according to claim 2, and in addition, means to compare said determined brake torque with a known standard brake torque test limit and provide a "passed" or "failed" display.

4. Apparatus according to claim 1, and in addition, means operative following operation of said engine at the equilibrium speed to accelerate the engine with full ignition to a speed above the equilibrium speed.

5. Apparatus for determining the brake torque of an internal combustion engine without connecting an external load to the engine, comprising
   means to operate the engine with all but one of $n$ of successive ignitions inhibited, the value $n$ being selected so that the engine operates with just enough power to equal the frictional load of the engine and maintain an equilibrium speed within the useful speed range of the engine,
   means to determine the average rate at which the engine decelerates during a predetermined deceleration speed range including said equilibrium speed when operating with all ignitions inhibited, and
   means to multiply the average rate of deceleration by the known inertia of the engine to determine the friction torque at the equilibrium speed,
   whereby the brake torque of the engine at the equilibrium speed can be determined by multiplying the friction torque by $n-1$, and the brake horsepower at the equilibrium speed can be determined by multiplying the brake torque in foot pounds by the equilibrium speed in radians per second, and dividing by 550.

6. Apparatus as defined in claim 5, wherein said means to determine the average rate at which the engine decelerates includes means to operate the engine with full ignition to accelerate the engine above the equilibrium speed, and means subsequently to operate the engine without ignition so that the engine decelerates through the equilibrium speed.

7. Apparatus as defined in claim 5, wherein said means to determine the average rate at which the engine decelerates includes means to operate the engine without ignition so that the engine decelerates from the equilibrium speed.

8. The method of testing an internal combustion engine, comprising
   operating the engine at an equilibrium speed determined by friction torque with all but one of $n$ ignitions inhibited,
   decelerating the engine without any ignition, and
   measuring the average rate of deceleration of the engine during a predetermined deceleration speed range including the equilibrium speed,
   whereby the brake torque of the engine is obtained by multiplying the average rate of deceleration by the known inertia of the engine and by $n-1$.

9. The method according to claim 8 and in addition the step of multiplying the average rate of deceleration by the known inertia of the engine and by $n-1$.

10. The method of determining the brake torque of an internal combustion engine without connecting an external load to the engine, comprising the steps of
    operating the engine with all but one of $n$ of successive ignitions inhibited, the value $n$ being selected so that the engine operates with just enough power to equal the frictional load of the engine and maintain an equilibrium speed within the useful speed range of the engine,
    measuring the average rate at which the engine decelerates during a predetermined deceleration speed range including said equilibrium speed when operating with all ignitions inhibited, and
    forming the product of the average rate of deceleration and the known inertia of the engine to determine the friction torque at the equilibrium speed,
    whereby the brake torque of the engine at the equilibrium speed can be determined by multiplying the friction torque by $n-1$, and the brake horsepower at the equilibrium speed can be determined by multiplying the brake torque in foot pounds by the equilibrium speed in radians per second, and dividing by 550.

* * * * *

UNITED STATES PATENT OFFICE
CERTIFICATE OF CORRECTION

PATENT NO. : 3,964,301
DATED : June 22, 1976
INVENTOR(S) : Richard Eric Hanson, Et Al.

It is certified that error appears in the above-identified patent and that said Letters Patent are hereby corrected as shown below:

```
Column  5, line 24, Change "/32" to --132--
Column  7, line 24, Change "xoten" to --ten--
Column  8, line 39, Change "40" to --4--
Column  9, line 60, Change "sysem" to --system--
Column 11, line 15, Change "The next statements" to --The next
4 statements--
```

Signed and Sealed this

Fourteenth Day of September 1976

[SEAL]

Attest:

RUTH C. MASON
*Attesting Officer*

C. MARSHALL DANN
*Commissioner of Patents and Trademarks*